United States Patent [19]

Merkel

[11] 4,185,425
[45] Jan. 29, 1980

[54] SURVEYOR'S MONUMENT

[76] Inventor: Jon A. Merkel, Old U.S. 1 North, Southern Pines, N.C. 28307

[21] Appl. No.: 939,255

[22] Filed: Sep. 5, 1978

[51] Int. Cl.² .................................................. E04H 13/00
[52] U.S. Cl. ........................................... 52/103; 33/293
[58] Field of Search ........................ 33/293; 85/36; 52/103,104

[56] References Cited

U.S. PATENT DOCUMENTS

| | | | |
|---|---|---|---|
| 2,181,032 | 11/1939 | Watkins | 52/103 |
| 2,779,240 | 1/1957 | Gaydos | 52/104 X |
| 2,913,950 | 11/1959 | Tinnerman | 85/36 X |
| 3,205,626 | 9/1965 | Attenberger | 52/103 |
| 3,307,264 | 3/1967 | Wolfe, Jr. | 33/292 |
| 3,321,834 | 5/1967 | Burns | 33/293 |
| 3,378,967 | 4/1968 | Baumeister | 52/103 |
| 3,688,454 | 9/1972 | Wolfcarius | 52/103 |
| 3,916,821 | 11/1975 | Pies | 52/103 |

FOREIGN PATENT DOCUMENTS 1433369  2/1966  France ........................ 52/103

Primary Examiner—Alfred C. Perham

[57] ABSTRACT

A new surveyor's monument characterized by its permanent connection with the ground, including an elongated metal stake and a plastic form monument permanently affixed on the upper portion of the stake. The monument member includes a hollow tube with a locking means at the upper end thereof and fixedly attached to said upper end by a plastic cap. The hollow tube is permanently embedded in the said plastic monument, said tube and locking means engaging the upper end of the stake.

6 Claims, 2 Drawing Figures

SURVEYOR'S MONUMENT

BACKGROUND OF THE INVENTION

The present invention relates to a surveyor's monument which is adapted to be permanently affixed to a metal stake driven into the ground at a land boundary or corner. The stake can be of any geometric cross-section. The invention can be utilized in operations such as surveying, street marking, decorative boundary marking, etc. and may be illuminated.

In the past, surveyor's markers have consisted of simply iron stakes driven into the ground at a boundary corner. After years of use or development of the property, the stakes are often hard to locate without conducting yet another survey. Furthermore, many of the prior art devices (1) are extremely cumbersome for transport by a surveying team, (2) are difficult to insert into the ground, (3) require a special tool for placement into the ground, such tools being easy to misplace or leave on location, (4) are awkward to store, transport, and handle, or (5) are difficult and expensive to manufacture.

Most important to the user of such markers, all of the prior art boundary markers or monuments require special and expensive equipment for metal forming, metal stamping, plastic forming and complex assembly procedures for the monument portion which is affixed to the upper end of a stake. Also, these conventional boundary marks are difficult to properly center and drive into the ground in a proper vertical alignment.

SUMMARY OF THE PRESENT INVENTION

The present invention consists of a monument body made of rigid synthetic material which is formed around and permanently bonded to a complementary hollow tube with a permanent locking means attached to the upper end thereof for the purpose of securely locking said monument to the upper end of an iron or metal stake driven into the ground so as not to be removable therefrom. The monument portion of the present invention is of sufficient cross-sectional diameter as to provide a surface upon which a surveyor can indicate the exact center of a boundary line even though the metal stake upon which the monument of the present invention is affixed may be off center or not driven into the ground in n exact vertical position. The hollow tube which is inserted in the approximate center of the monument is preferably of plastic and can be of variable diameter, the inner diameter of which is slightly larger than the outer diameter of the metal stake so as to allow the stake to slide smoothly and snugly into said tube. The locking means at the upper end of the hollow plastic tube is generally held in place by any suitable plastic or metal cap which can be bonded to or otherwise held on the upper end of the plastic tube embedded in the monument.

The locking means at the upper end of the tube is larger in diameter than the plastic tube so that when it is engaged with and locked onto the stake, it cannot be pulled through the plastic tube allowing the monument to be removed from the stake.

The most preferred means whereby the metal stake is permanently locked into the monument of this invention is a metal cap having a horizontal, circumferential flange with a central opening therein through which the metal stake can be inserted. Generally the cap will be enclosed at the upper end thereof yet be of sufficient depth to allow the end of the metal stake to pass through the opening. The locking function is accomplished by having the central opening of the cap narrowed or made smaller by one or more metal fingers or portions angled obliquely upward from one side of the central opening towards the other side of the central opening. The upper end of the stake is very slightly tapered to facilitate insertion into the narrowed opening of the cap locking means causing the angled fingers or portions to expand around the upper end of the metal stake and yet, because of the upward angle of these portions, not allow the removal of the upper end of the stake from the locking means.

Such a surveyor's monument as above-described is very economically manufactured form commercially available components generally available in other technological skills, but which have never heretofore been assembled in the manner provided herein to create the novel and useful surveyor's monument of the present invention.

The monument of the present invention is characterized by its economy, in terms of cost of construction and ease of manufacture with little or no expensive metal forming, plastic forming or metal stamping, kilns or other equipment. It is further characterized by its ease of handling and shipping, ease of use on conventional surveyor's metal stakes and its ablitity to be applied to a metal stake without the use of any extra tools or equipment.

It is an object of the present invention to provide a new and useful surveyor's monument that is inexpensive to manufacture and is adaptable for use with conventional surveyor's stakes by being permanently affixed thereto.

It is yet another object of this invention to provide a monument construction which, by changing the shape and/or color of the monument, can be adapted for use as a decorative driveway marker, a street marker, or public utilities marker, etc.

BRIEF DISCRIPTION OF THE DRAWINGS

DESCRIPTION OF THE PREFERRED EMBODIMENTS

The drawings attached to the specification reflect the preferred embodiment of the invention. The drawings are, however, provided only for purposes of illustration and with no intention or desire in limiting the shapes or configurations of the surveyor's monument of the instant invention. Furthermore, the description of the preferred embodiments recites certain materials of construction. It should be pointed out that there are other complementary materials, in addition to the ones named, which will be suitable for use with the present invention.

Figure 1:
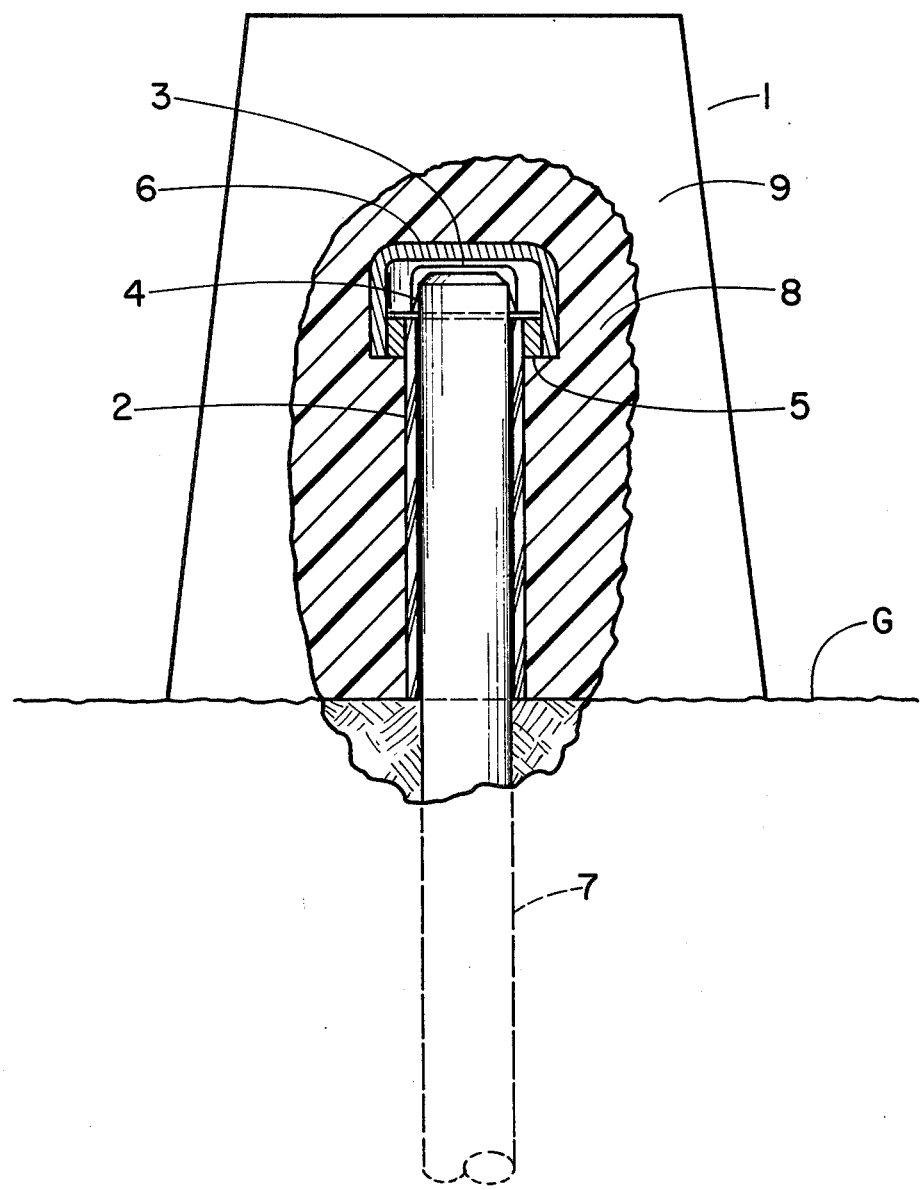
FIG. 1 is a view of the surveyor's monument of the present invention fixedly attached to a metal stake driven in the ground. The cutaway portion of the drawing depicts the construction arrangement of the central plastic tube and locking means and the manner of engagement with the metal stake.
Figure 2:
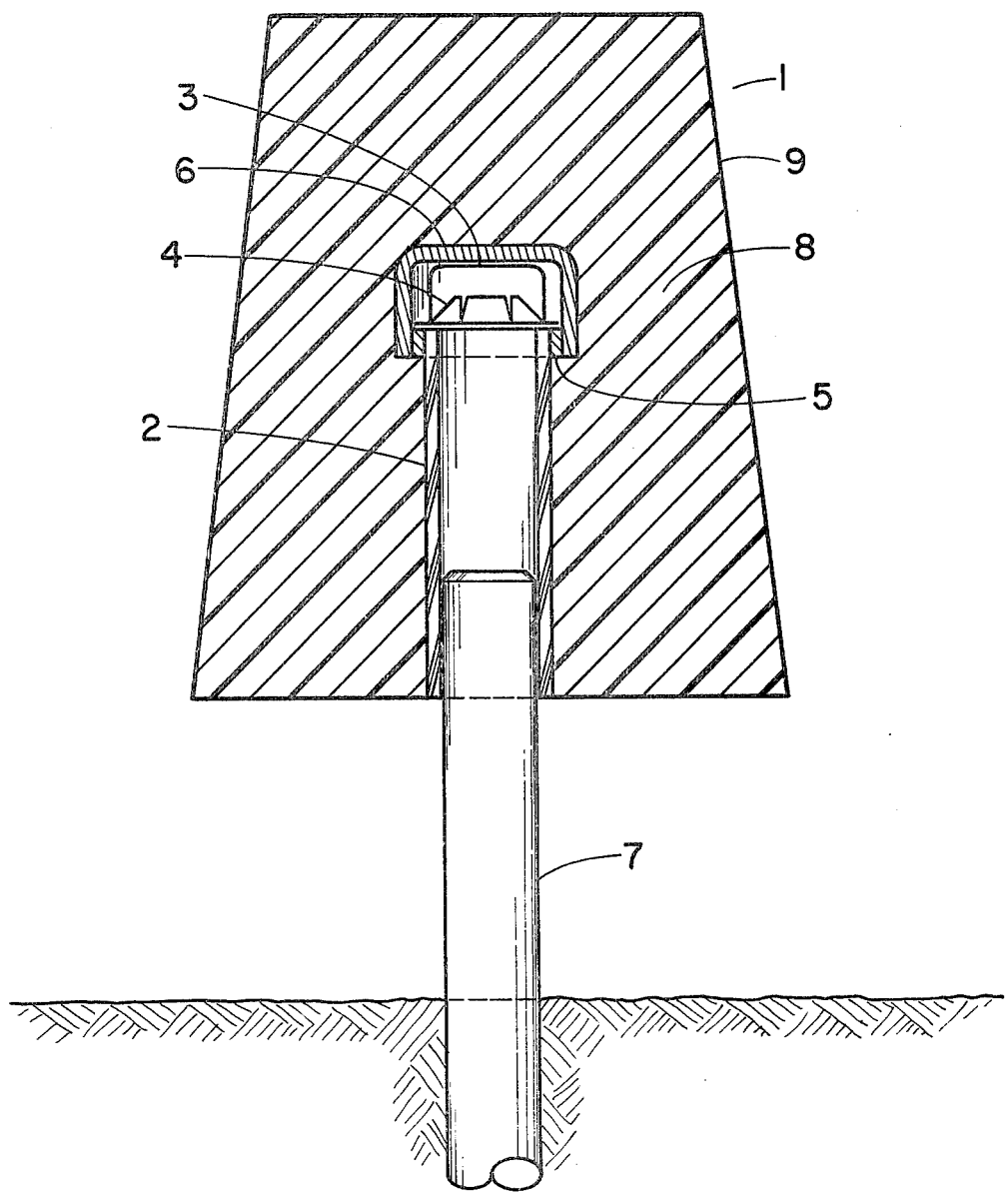
FIG. 2 is a cross-sectional enlargement of FIG. 1 showing, in more detail the arrangement of the components of the surveyor's monument and the manner in which the metal stake is inserted into the tube forming the central core of the monument.

Referring again to the drawings, it should be pointed out that like reference characters designate corresponding components in each of the two drawings. A preferred form of the invention is illustrated in FIGS. 1 and 2.

As seen in these figures, the monument includes a body, numeral 1, formed of a suitable shap-sustaining synthetic material. The main body of the monument can be formed of a material such as plastic. Preferrably, in order to make the monument lightweight, the shape-sustaining synthetic material is a polyurethan foam. For purposes of its use as a surveyor's monument, the preferred shape is one of a four-sided obelisk, of a square cross-section, slightly tapered at the upper end thereof. The vertical length of the monument can be varied depending upon the needs of the surveyor. The other coating, numeral 9, of the monument can be of any substance and of various colors. For instance, the coating may be a conventional paint or any type of plastic coating, pigmented according to choice. One of preferred coatings is polyester gel coat of a given color. The reason this is preferred is that the polyester gel coat can be applied to the inner side of the monument mold into which the polyurethane foam is injected.

The central core of the monument, numeral 1, designed for placement over a metal surveyor's stake, numeral 7, is designed, in its preferred embodiment, of four component parts. A rigid tube, numeral 2, made preferrably of a synthetic material, such as a plastic PVC pipe, has a locking means, numeral 3, placed upon the upper end thereof, said locking means designed for engagement with the metal stake in such a manner that the licking means cannot be removed from the end of the metal stake by normal means. The locking means is, in the preferred embodiment, a metal locking cap formed as a metal washer having an inner diameter approximately equal to the inner diameter of the said plastic tube, numeral 2. Extending above the central opening of the flange and angled in an upwards vertical direction across the central opening of said locking means are one or more fingers, numeral 4, so narrowing the opening of the locking means through which the metal stake, numeral 7, passes as to engage the metal stake and prevent said stake from being pulled back through the opening in the locking means. The preferred cap locking means has a recessed cap extending over the inner diameter of the flanged portions thereof.

In order to hold the locking means, numeral 3, on the upper end of the plastic tube, numeral 2, a rigid cap, numeral 6, such as a plastic PVC cap is placed over the locking means and a portion of the upper end of the plastic tube and is bonded to the upper end of the plastic tube by the use of a glue or other suitable bonding material. It may be necessary, in the manufacture of the device of this invention in its most economical form, to provide a suitable washer or washers of synthetic material, numeral 5, on the upper end of said plastic tube, numeral 2, in order to allow a tight fitting of the rigid cap, numeral 6, to the upper end of the plastic tube, numeral 2. The need for the use of a glue material to bond the plastic cap, numeral 6, (and washers, numeral 5, if any) to the upper end of said plastic tube, numeral 2, may be dispensed with where the said cap, numeral 6, and plastic tube, numeral 2, are so sized in relation to one another as to be frictionally engaged.

Once the plastic tube, numeral 2, the stake locking means, numeral 3, the cap, numeral 6, and the washers, numeral 5, if necessary, are arranged according to the above disclosure and bonded to one another either through the use of a bonding agent such as glue or by friction, they are inserted or held in place in the cental area of a suitable mold for the forming of the monument. A polyurethane foam material, numeral 8, is injected into the mold and, in a matter of seconds, fills the mold and, as it hardens, bonds to the rigid tube, numeral 2, and caps, numeral 6, over the upper end of the tube. Once this material has cooled and solidified, the surveyor's monument is removed from the mold and ready for placement over the surveyor's stake, numeral 7.

Once the metal stake, numeral 7, is driven into the ground, designated in FIG. 1 by the letter G, the monument, numeral 1, in its assembled form, is placed over the stake, as shown in FIG. 2. It should be noted that the top end of the stake should be slightly tapered to facilitate the passage of the end of the stake through the locking fingers or portions, numeral 4, of the stake locking means, numeral 3. Once the monument rests on the top of the metal stake, the application of a moderate downward force will force the upper end of the stake, numeral 7, through the locking fingers, numeral 4, and, because of the upperward alignment of those locking fingers, the monument cannot be removed from the end of the metal stake without the application of extremely abnormal forces.

There are obvious modifications that can be made to the preferred embodiment without departing from the scope of the present invention. For example, the metal stake, numeral 7, can be of any geometric cross-section, as long as the plastic tube, numeral 2, and the stake locking mechanism, numeral 3, are of the appropriate female mating configuration. Certainly, other types of plastic materials can be used to form the monument body, although the polyurethane foam, discussed with the preferred embodiment, is one of the cheapest and easiest to mold.

As stated earlier in the specification, one of the unique features of the present invention is tis utilization of conventionaly available materials from other technological arts in the arrangement of the present structure, thus faciliting a most inexpensive manufacturing cost.

The use of the cap, numeral 6, formed of a synthetic rigid material, such a plastic PVC, is specified to provide a solid enclosure for the stake locking mechanism and prevent the polyurethane foam from seeping into the upper end of the central tube, numeral 2. This cap also serves a secondary purpose of preventing the tube and stake locking means from being compressed into the foam body of the monument. Such would cause a compression of the foam at the general location of the stake locking cap and the end of the stake. This would cause a loose connection and allow for some play between the monument body, numeral 1, and the stake, numeral 7, which is secured in the ground. Certainly there are other means of securing the stake locking mechanism, numeral 3, to the upper end of the plastic tube, numeral 2. However this method provides the best results at the lowest cost.

The device of the present invention provides the above benefits over all of the devices of the prior art, such as the devices illustrated in U.S. Pat. No. 3,916,821; 3,688,454; 3,378,967; 3,321,834; 3,307,264; 3,205,626; 2,779,240; and 2,181,032.

As stated earlier, the surveyor's marker assembly illustrated in the drawings and described in the above specification is subject to structural variation without departing from the spirt and scope of the appended claims.

Having thus described my invention, what I claim is:

1. A surveyor's monument compromising a body made of rigid synthetic material, having a central core therein adapted for placement on the top of a conventional surveyor's metal stake, said stake having a slightly tapered upper end, said central core compromising (a) a section of tubing made of a synthetic material complementary to the rigid body of the surveyor's monument, (b) a stake locking means, placed over the upper end of said tube, said stake locking means having an opening therein smaller than the diameter of said stake and through which said stake is pressed to permanently affix said means to said stake, (c) and a means for securing said stake locking means to the upper end of said tube in such a fashion as to prevent the passage into said tube during the manufacturing process of the plastic material which forms the surveyor's monument body, the central core of said surveyor's monument compromised of parts (a), (b), and (c), being completely surrounded by the synthetic material compromising the body of the surveyor's monument.

2. The surveyor's monument as in claim 1 wherein the outer surface of the monument body has a coating of a pigmented polyester gel coat.

3. The surveyor's monument as in claim 1 wherein the said synthetic material making up the body of said monument is a polyurethane foam.

4. A surveyor's monument as in claim 3 wherein the said securing means for securing the said stake locking means to the upper end of said tube consists of a rigid cap which is securely affixed to the upper end of said tube having the stake locking means thereon.

5. The surveyor's monument of claims 4 wherein the said tube component of the central core is made of a plastic PVC material and is of an inner diameter slightly greater than the outer diameter of the metal stake over which said monument is placed.

6. A surveyor's monument as in claim 3 wherein the stake locking means consists of a metal cap having flanged edges which engage the upper end of said tube, said cap having an opening therein with an inner diameter at least equal to the inner diameter of said tube and a depth of sufficient size to receive the tapered upper end of the metal stake, said stake locking means also having at least one metal finger or portion protruding accross the opening in said metal cap in a vertical oblique angle in such a configuration that when the tapered upper end of said stake protrudes through the said opening in the said metal cap, the said angled metal finger or portion permanently engages said upper end of said stake to prevent is removal from said metal cap.

* * * * *